Oct. 16, 1945.   L. V. WHISTLER ET AL   2,386,920
PUNCH AND DIE ASSEMBLY
Filed June 12, 1943   3 Sheets-Sheet 1

Lawrence V. Whistler
Sanford A. Whistler } Inventors.
By Emil Xxxxxxx
Attorney.

Oct. 16, 1945.　　L. V. WHISTLER ET AL　　2,386,920
PUNCH AND DIE ASSEMBLY
Filed June 12, 1943　　3 Sheets-Sheet 2

Lawrence V. Whistler
Sanford A. Whistler
Inventors.

By Emil Zubart
Attorney.

Lawrence V. Whistler
Sanford H. Whistler
Inventors,

By *Emil Kueharl*
Attorney.

Patented Oct. 16, 1945

2,386,920

UNITED STATES PATENT OFFICE 2,386,920

PUNCH AND DIE ASSEMBLY

Lawrence V. Whistler and Sanford A. Whistler, Kenmore, N. Y.

Application June 12, 1943, Serial No. 490,694

28 Claims. (Cl. 164—118)

Our invention relates to a punch and die assembly for use in power presses or die-sets placed within such presses.

One of the objects of our invention is to provide a die assembly with which sheet metal or other sheet material may be perforated and the perforations in the material be spaced in close proximity to each other in any direction relatively.

Another object of our invention is to provide simple and inexpensive punches and dies adapted to be fastened in openings or holes in punch and die retainer-plates, respectively, by means within the areas of said openings or holes and accessible from the space between said plates so that any punch or die, or any punch-and-die couple or couples in the assembly can be conveniently removed, or another punch-and-die couple or other punch-and-die couples adapted for punching larger or smaller perforations be easily substituted.

Another object of our invention is to provide a die assembly consisting of comparatively thick punch and die retainer-plates adapted to be secured to the ram and bed or shoe of a die-set, which plates are provided, respectively, with punch-receiving openings and die-receiving openings arranged in pairs in axial alinement, punches and dies preferably formed of cylindrical stock, thrust into said openings, and means within the areas of said openings accessible from the space between said plates engaging the walls of said openings to fasten the punches and dies in place.

A further object of our invention is to provide a punch-and-die couple in which the die or die-member is formed of cylindrical material and provided with a punch-receiving or die hole extending downwardly from its upper end and opening into a slug-clearance space or passage milled into the die from the side thereof and having the punch-receiving or die hole of the die opening into said slug-clearance space or passage.

A still further object of our invention is to provide a punch-and-die assembly having comparatively thick punch and die retainer-plates operatively spaced apart and provided with punch and die-receiving openings at selectively spaced-apart points, which openings are arranged in pairs with the openings of each pair axially alined, cylindrical punches entered in the openings of the punch retainer-plate and cylindrical dies entered in the openings of the die retainer-plate, spring-devices secured to the underside of the punch retainer-plate at selective points thereof, a stripper-plate removably applied to said spring-devices and having openings into which the punch terminals of said punches extend and through which they are movable so as to perforate stock supported on said dies and against which said stripper-plate is designed to bear during the operation of said assembly.

Our invention still further has for its object to provide auxiliary stripper-devices designed for attachment to certain punches independent of said stripper-plate when operating upon a work-piece in which closely spaced perforations are required in a given region and more widely spaced and less numerous perforations in regions of the work-piece not covered by the stripper-plate, or when operating under other special conditions.

With the above and other objects in view to appear hereinafter, our invention consists in the utilization of steel rod-material for constructing the punches and dies of a punch-and-die or perforating-couple and in forming a lateral slug-clearance space or passage by milling the same into the die member from one side thereof so as to intersect the lower end of the punch-receiving or die hole in the die.

Our invention also consists in the employment of comparatively heavy punch and die-holders or retainer-plates having openings therein positioned in pairs with the openings of each pair in axial alinement, and inserting into the openings in said retainer-plates, punch and die members formed of cylindrical material for which said plates, by reason of their thickness, provide long bearing-surfaces within the openings formed therein for said punch and die members, in the employment of fastening means engaging the walls of said openings, in providing a stripper-plate with holes into which the punch terminals of said punch members extend and in securing to the underside of the punch retainer-plate spring-devices to which said stripper-plate is attached, said spring-devices being arranged at selectively spaced-apart points not occupied by the punch and die members.

Our invention further consists in the novel features of construction, and in the arrangement and combination of parts to be hereinafter described and more particularly pointed out in the subjoined claims.

Our invention is illustrated in the accompanying drawings, in which.

Figure 1:
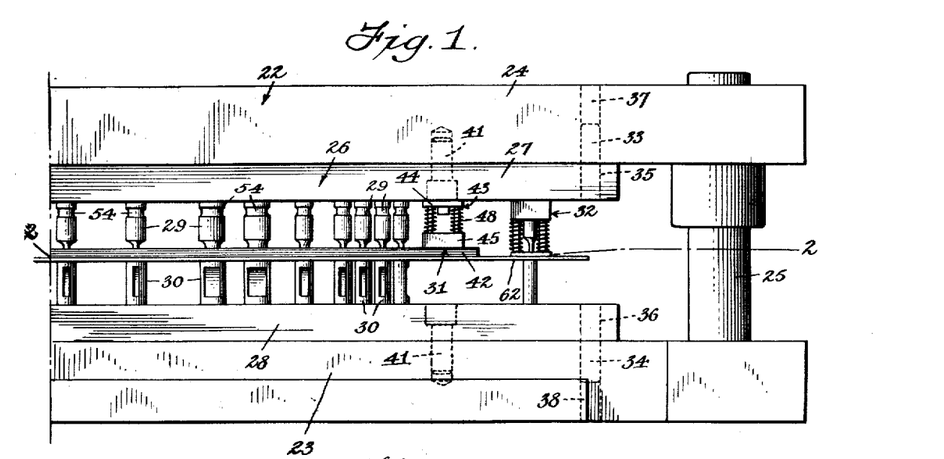
Fig. 1 is a front elevation of one-half of a die-set in which our improved die-assembly is placed.
Figure 2:
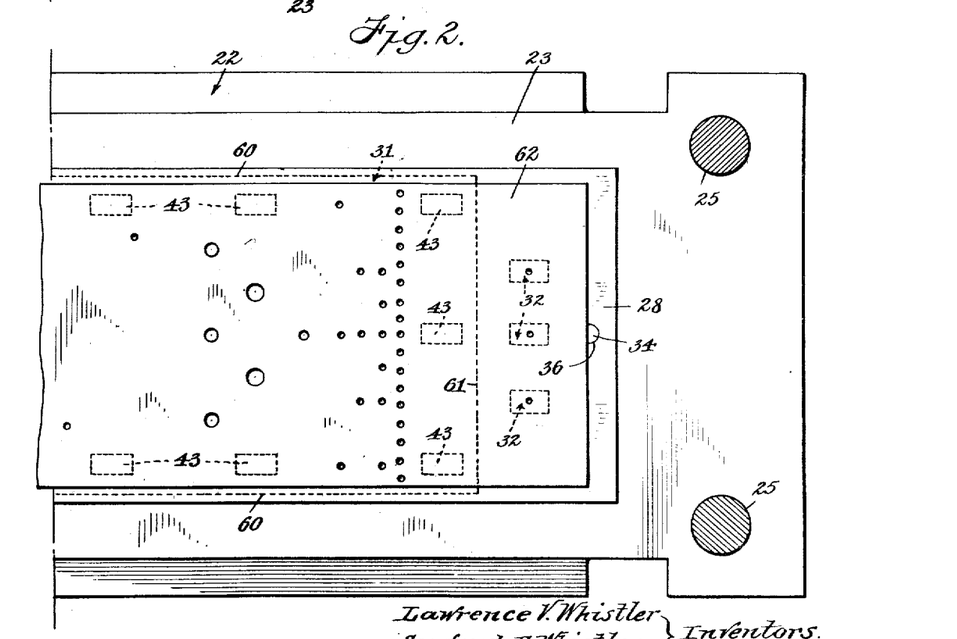
Fig. 2 is a horizontal section taken on line 2—2, Fig. 1, showing the stock perforated according to the punch and die assembly shown in Fig. 1.

Referring to the drawings in detail, the numeral 22 designates a die-set comprising the usual bed or shoe 23, the ram 24, and the guide-posts 25 by means of which the ram and bed or shoe are guided for relative movement in the usual manner. In Figs. 1 and 2 only one-half the length of this die-set is shown.

26 designates our improved die-assembly, which comprises punch and die mountings in the form of a punch retainer-plate 27 and a die retainer-plate 28, punches 29, dies 30, and stripper-mechanism 31 considered as a whole with which, under certain operating conditions, stripper-devices 32 are used as auxiliaries to the stripper-mechanism.

The punch retainer-plate 27 is positioned against the underside of the ram 24 of the die-set by means of dowel pins 33 and the die retainer-plate 28 is also positioned against the upperside of the bed or shoe 23 of the die-set by means of dowel pins 34. The punch retainer-plate and the die retainer-plate are provided with dowel pin openings 35 and 36, respectively. The dowel pins are fastened in the retainer-plates and project therefrom and the projecting portions are entered into dowel-pin openings 37 and 38 formed, respectively, in the ram and bed or shoe of the die-set.

The punch and die retainer-plates are also provided with punch-receiving openings 39 and die-receiving openings 40, respectively, and these are drilled or otherwise formed in the plates according to openings formed in a template, in conformity with which a work piece is to be perforated. When forming the openings in the retainer-plates, the punch retainer-plate, the die retainer-plate and the template are arranged in superimposed relation with the template at the top. In this condition they are clamped or otherwise retained against movement relatively and the retainer-plates drilled according to the openings in the template. The openings 39 and 40 so formed in the retainer-plates extend completely through the latter, and this is also true with respect to the openings for the dowel pins. Consequently, it is necessary to form the dowel-pin openings 37 and 38 in the ram and bed or shoe of the die-set at points therein to conform to the exact locations of the dowel pins projecting from the retainer-plates and when placing the said plates in position within the die-set and using said dowel-pins as guides, assurance will be had that the punch-receiving openings in the punch retainer-plate will be axially alined with the die-receiving openings in the die retainer-plate. When the retainer-plates are positioned by means of the dowel pins 33 and 34 they are fastened to the ram and bed or shoe of the die-set by means of securing bolts 41. If desired, the dowel-pin openings may be omitted and the dowel pins dispensed with, but under certain conditions the use of dowel pins provides decided advantages. When, however, dispensed with it will be necessary to provide gauge or guide openings in the template for determining the locations of the openings in the retainer-plates for the securing screws 41. These last-mentioned openings would then be drilled while the retainer-plates and template are clamped together for drilling the openings to receive the punches and dies. The openings for said securing screws would then be tapped to conform to the threads of the securing screws and the mere fastening of the retainer-plates would assure concentric alinement of all punches and their mating dies.

The retainer plates are comparatively thick, meaning that they are at least as thick as the diameter of the portions of the largest punch and/or die inserted therein. The walls of the punch-receiving openings and the die-receiving openings in said plates therefore provide long bearing surfaces for the punches 29 and dies 30, which prevents wabbling movement of the latter tending to disaline their operating ends.

The punches are formed of cylindrical steel rod-material of a diameter to snugly fit the punch-receiving openings in the punch retainer-plate and the dies 30 are also formed of cylindrical steel rod-material to snugly fit the die-receiving openings in the die-retainer-plate 28.

The diameters of the punches and dies may be varied, depending on the size of the perforations or holes which they are to punch in the workpiece, and invariably the punches are reduced in diameter at their punch ends, as will appear hereinafter; but, if desired, the punches of the larger sizes may be of even diameter from end to end.

The stripper-mechanism 31 comprises a stripper-plate 42 and spring-devices 43 fastened thereto and to the punch retainer-plate 27. Said spring-devices are located relative to the stripper-plate in any manner found convenient to distribute the forces of said spring-devices evenly, as near as possible, over the stripper-plate area, and their locations with respect to the particular stripper-mechanism shown are indicated by dotted lines and are also designated by the numeral 43 in Fig. 2. Each spring-device 43, in its preferred form, comprises a flat header 44, a shoe 45, guide-rods 46 reduced at their upper ends and threaded into said header and slidably arranged at their lower ends in the shoe 45; said shoe being comparatively thick to provide comparatively long slide-openings 47 for said guide-rods, and spiral springs 48 which bear at their upper ends against the underside of the header and at their lower ends against the upperside of the shoe; preferably four guide rods with the spiral springs 48 surrounding them are employed in each spring-device; the header 44 and shoe 45 being rectangular so that these rods are located near the four corners of said header and shoe.

The stripper-plate 42 is secured to the shoes of the spaced-apart spring-devices 43 by means of countersunk screws 49 and the spring-devices are fastened to the underside of the punch retainer-plate by a screw stud 50 extending upwardly from its header 44. This screw stud is formed by passing a short screw-bolt through the header from the bottom thereof and brazing or otherwise immovably securing said bolt to said header so that the latter and said bolt will in effect be a unitary structure. This enables the entire spring-device to be threaded as a unit into the punch retainer-plate and after all spring-devices are so secured, the stripper-plate 42 is fastened to all of said spring-devices by means of the countersunk screws 49. The use of these countersunk screws assures a smooth lower surface for the stripper-plate.

The punches and the dies are preferably of cylindrical steel-stock and the majority of punches used are turned down at their punch or operating ends to the size required for punching the holes in the stock. As clearly shown in Fig. 2, the perforations or punch holes in the work-piece are in many instances of different diameters and in some instances punches and dies used for punching the smaller holes would not be large enough for punching holes of larger sizes, even though no reduction in diameter were made at their punch ends. It will be apparent from Fig. 1 that the body portions of the punches may be of like diameter, while the punch or operating ends vary in size, but it will also be apparent that when the holes to be punched approximate the size of the bodies of the punches, the punches will be made of stock of larger diameter. The punch or operating ends of these larger size punches may also be varied in diameter to cover a certain range of sizes. This variation in size of stock used is also carried out in the case of the dies, and as the punches and dies are paired for co-action, the two members for each punch-and-die couple are preferably of like diameter.

Figure 3:
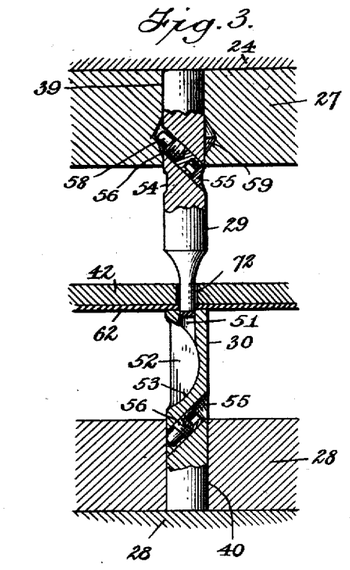
Fig. 3 is a sectional elevation of a perforating couple and the manner of securing the two members thereof in the punch and die retainer-plates, the punch being shown as having perforated a work piece.

Each die has a punch-receiving or die hole 51 formed therein from its upper end and it is provided with a laterally-opening slug-clearance space or passage 52 which intersects the lower end of the punch-receiving or die holes, as best shown in Fig. 3. This slug-passage is milled into the die from one side thereof, the side walls of the passage being spaced apart a distance equaling at least that of the diameter of the lower end of the punch-receiving or die hole 51, the upper portion of which hole conforms to the diameter of the punch end of the punch co-acting with said die, while its lower portion is gradually enlarged downwardly so that the slugs may easily pass therethrough and be discharged laterally from the die through the slug-passage thus formed. The remaining or inner wall of said passage is arcuate to assure a lower inclined portion 53 along which slugs delivered into said passage will ride and be delivered thereby onto the die retaining-plate. The passage 52 may therefore be termed a particircular vertically-trending passage which merges into the die hole 51 and intersects the latter.

Figure 5:
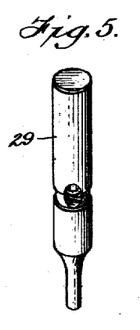
Fig. 5 is a detached perspective view of a complete punch.

It may here be stated that the retainer-plates 27 and 28 are preferably formed of steel, but plastic material, Masonite, or any other suitable material may be used for this purpose. Each of the punches may be provided between its ends with a shallow peripheral groove 54, as shown in Fig. 3, or such groove may be omitted, in which case the punch appears as shown in Fig. 5. When punches are provided with the grooves just mentioned, such grooves serve no purpose when the punches are used in conjunction with the stripper-mechanism 31; but in cases where an auxiliary stripper element or device, such as shown at 32, is employed, the groove 54 serves as a medium to attach the stripper-device to the punch, as will be explained hereinafter.

Figure 6:
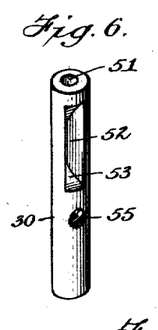
Fig. 6 is a detached perspective view of a complete die.
Figure 7:
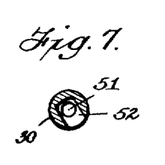
Fig. 7 is a cross section of a die taken in the plane of the slug-clearance space or passage formed therein, looking up.

It is, of course, apparent that the holes in a template used for locating the holes in the retainer-plates will govern the sizes of the punches and dies to be employed and in each instance where stripper-mechanism, such as 31, is used in conjunction with the punches and dies, both the punches and dies are complete in the form shown in Figs. 5 and 6; no projecting parts being employed in conjunction therewith. This feature of our invention we desire to particularly stress, since neither the punch or die of any perforating couple occupies more space on the surface of the retainer-plate into which it is fitted than the cross sectional area of the punch or die, per se. Consequently, these punches and dies can be positioned relatively in any direction in the retainer-plates and in closer proximity to each other than has heretofore been possible.

It is advisable to provide means to secure the punches and dies within their respective retainer-plates and this is accomplished by providing means which do not extend beyond the periphery of the portions of the punches and the dies which project from the retainer-plates. We arrange such means, in preferred form, to engage the walls of the punch and die-receiving openings, yet be accessible from the space between said retainer-plates.

This may be accomplished in various ways. For example, as shown in Fig. 3 of the drawings, a tapped opening 55 is bored diagonally through the bottom portion of the die beneath the slug-passage 52 therein and when the die is fitted within its receiving hole in the die retainer-plate 28, one end of said tapped opening opens to the side of the die directly above the surface of the die retainer-plate while the other end thereof opens against the wall of the die-receiving opening in said plate. A securing screw 56 is threaded into said tapped opening and its inner end caused to impinge against the wall of the opening into which the die is fitted. This securing screw is of the type best shown in Fig. 4 and it has a socket 57 at its outer end by means of which it may be rotated to loosen or tighten the same. The inner end of this screw is reduced in diameter, as at 58, and left unthreaded. For a die which is fitted into a retainer-plate and has its lower end bearing firmly against the bed or shoe of a die-set or any object serving as a like abutment, the means for securing the die shown in Fig. 3 is very effective and this is especially true when the die retainer-plate is constructed of plastic material, Masonite, matrix metal, or the like.

Figure 4:
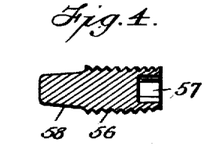
Fig. 4 is a longitudinal section through one of the wedge-action securing or retaining screws employed to fasten the punch and die of a perforating couple in their respective receiving openings formed in the punch and die retainer-plates.

The punches are, however, subjected to greater strain than the dies and for this reason we form a depression 59 in the wall of the punch-receiving opening 39. This depression may be a spot depression, which is preferable in some cases, or it may be a depression extending partly around the wall of the punch-receiving opening, or entirely around said wall. We preferably taper the unthreaded inner end of each securing screw, as best shown in Fig. 4, and this unthreaded end is designed to enter the depression in the wall of the punch-receiving opening, regardless of whether said depression is a spot depression, a parti-annular, or an annular depression. The securing screw is threaded into the punch and as stated, it is socketed at its outer end to enable it to be engaged by a wrench or other suitable tool, while the opposite or inner end projects therefrom at a point in a plane above the under-surface of the punch retainer-plate. Thus the unthreaded inner end of said securing screw has its surface presented to the wall of the depression at a certain angle and, with respect to the axis of said securing screw, we form the lower portion of said depression at a greater angle than the angle of the taper at the end of the securing screw, so that the slightly rounded inner end of the said screw will engage the lower portion of the wall of said depression and the screw thus acts as a wedge tending, when tightening the securing screw, to force the punch inwardly or upwardly firmly against the ram of the die-set, or any other abutment element to which the punch retainer-plate may be secured.

It may again be stated that if the punch retainer-plate is constructed of plastic material, Masonite, matrix metal, or similar material enabling the securing screw of a punch to slightly indent the wall of the punch-receiving opening, the depression in said wall shown for the punch in Fig. 3, may be dispensed with. However, where harder material, such as steel or other hard metal is employed for a punch retainer-plate, we prefer to employ the depression in the wall of the punch-receiving opening, regardless of whether said depression is partly circumferential, entirely circumferential, or only a spot depression.

We particularly wish to stress the point that only so much of the exposed surfaces of the retainer-plates are occupied in using our improved punches and dies as the cross sectional area of these elements and that no portion of the surfaces of these retainer-plates immediately surrounding the punches and dies is covered up by parts associated therewith. We are, therefore, able to have the punch and die-receiving openings formed in their respective retainer-plates in much more closely spaced relation than has heretofore been possible, with assurance of a secure fastening of the punches and dies in said retainer-plates, especially since the fastening means for said punches and dies are easily accessible from the space between the retainer-plates—which space may be referred to as the work space—and no projecting portions exist on the punches and dies except within the punch and die-receiving openings formed in said plates, and then only when it is desired to have the securing screws enter depressions formed in the walls of the punch and/or die-receiving openings.

It may here be stated that the slug-passage formed in the different dies vary in width, depending on the diameter of the punch and the punch-receiving or die opening in the die and the diameter of the slugs punched from the work-piece.

As clearly shown in Fig. 1, the work-piece is positioned on the upper ends of the dies and as is common in an apparatus of this kind, means are provided for properly positioning the work-piece, both lengthwise and laterally. This however, is not shown since it forms no part of our invention.

Figures 9, 10, 11:
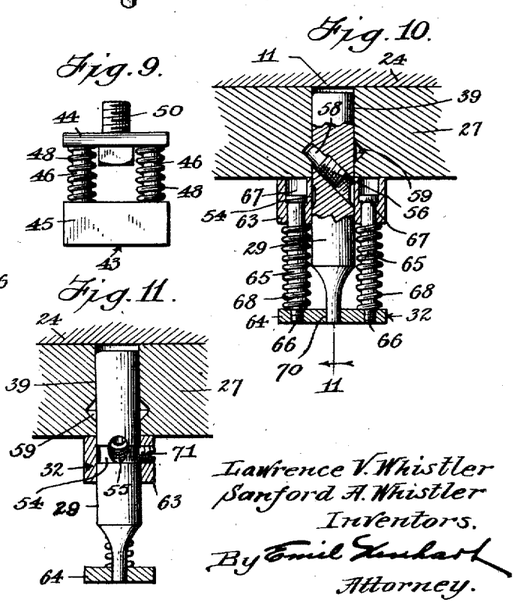
Fig. 9 is a side elevation of the spring-device shown in Fig. 8, the stripper plate being omitted.
Fig. 10 is a vertical section through one of the stripper elements associated directly with a punch and designed for use when widely spaced-apart regions of the work piece outside of the area occupied by the stripper-plate are to be perforated.
Fig. 11 is a transverse section taken on line 11—11, Fig. 10, showing the punch in elevation and the manner of securing a stripper element thereto.
Figure 12:
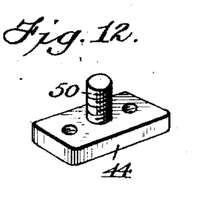
Fig. 12 is a detached perspective view of the upper cross member or header of the spring-device shown in Fig. 9, its securing screw being shown projecting upwardly therefrom.

As shown in Fig. 2, the striper-plate is of the width indicated by the parallel dotted lines 60 an the rear end thereof by the dotted line 61. The work-piece or sheet of metal to be perforated is designated by the numeral 62 and in the drawings we have shown that this work-piece is to be perforated at three points not covered by the stripper-plate 31. While this stripper-plate could have been extended to incorporate within its structure the punches and dies shown associated with the auxiliary stripper-devices, we have found it preferable in some instances where holes are required in the work-piece outside of the area of the stripper-mechanism already set up in a die-set, to utilize auxiliary or individual stripping means for the punches and dies which are to punch the additional perforations or holes. In such instances, each die 30 is fastened in a prepared die-receiving opening in the die retainer-plate and a punch is also fastened in the punch retainer-plate in axial alinement with said die. The stripper-devices 32 are applied directly to the punches and, like the spring-devices 42 of the stripper-mechanism 31, they are designed to exert pressure against the work piece at regions surrounding the punch ends of the punches. Like the spring-device 43, each stripper-device comprises a header 63 which is comparatively thick and a shoe 64 which is comparatively thin, a reversal of the arrangement provided in the spring-device 43. Associated with the header 63 and shoe 64 are guide-rods 65, the lower ends of which are reduced in diameter and threaded, as at 66; these threaded ends being fastened into the shoe 64. The upper ends, of the guide-rods are slidable in guide-holes 67 formed in the header and surrounding these guide-rods are spiral springs 68, the upper ends of which bear against the header and the lower ends against the shoe. Like the punches employed in association with the stripper-mechanism 31, the punches associated with the auxiliary stripper-devices are fastened in place in the same manner, but we have shown in Fig. 10 a slight deviation in the manner in which the securing screw engages the depression in the punch retainer-plate. In this instance the angle of the lower portion of the depression corresponds with the angle of the unthreaded surface of the securing screw engaging it. This is not as desirable as the arrangement previously described, but for some purposes will be quite efficient. The header 63 is provided with a central opening conforming in size to that of the diameter of the punch, and the shoe 64 is provided with an opening 70 to receive the punch end of the punch. In instances where auxiliary or individual stripper-devices are applied to punches, the peripheral groove 54 in the punch is utilized to secure the stripper-device thereto and for this purpose a set screw 71 is passed through the header 63 in line with the groove 54 of the punch; the screw, when tightened, entering the groove and holding the stripper-device securely to the punch, as best shown in Fig. 11.

The stripper-plate necessarily has openings 72 punched or otherwise formed therein which are axially co-incident with the punch and die-receiving openings in accordance with a template in which the openings therein are axially co-incident with those of the retainer-plates. The openings in the template closely approximate the size of the openings to be stamped in the work-piece, and therefore, the punch ends of the various punches of the assembly are normally positioned within said openings 72.

The punches and dies may be fitted to their respective retainer-plates before securing the latter within the die-set and when said plates are properly positioned by means of the dowel pins 33 and 34, assurance will be had that all punches and dies fastened to the plates after the latter are secured in place will be in axial alinement. The stripper-mechanism 31 may also be secured to the punch retainer-plate before inserting the latter into the die-set, but this can also be effected after the punch retainer-plate is secured within the die-set. In the latter case it is only necessary to grasp the spring-devices and as a unit thread the screw-studs 50 into the retainer-plate. After placing the various spring-devices in the positions selected for them, depending on the arrangement of the punches and dies used in the assembly, the stripper-plate 42 may be positioned over the punch ends of the various punches and against the spring-devices 43, after which the countersunk screws 49 may be passed through the stripper plate and threaded into the various shoes of the spring-devices.

Where auxiliary stripper-devices are employed, such as 32, the punches associated therewith are positioned in the punch retainer-plate and a stripper-device passed over the punch and secured in place by its set screw 71. This also may be accomplished before or after the punch-retainer plate is placed within the die-set and secured to the ram thereof.

Figure 8:
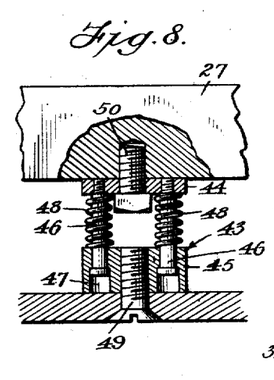
Fig. 8 is a sectional view of one of the spring-devices removably attached to the punch retainer-plate and having the stripper-plate removably attached thereto.
Figure 13:
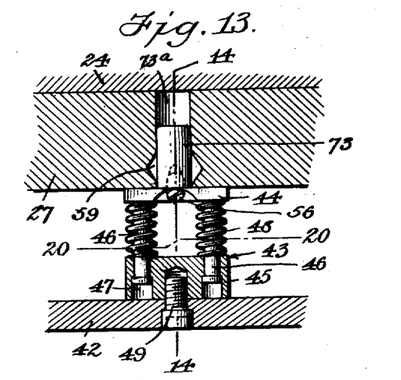
Fig. 13 is a section of a spring-device in modified form, shown in connection with the stripper-plate.
Figure 14:
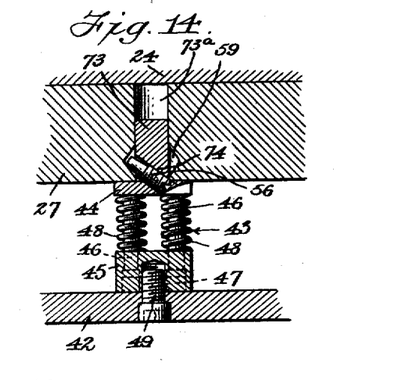
Fig. 14 is a section taken on line 14—14, Fig. 13.
Figures 15, 16:
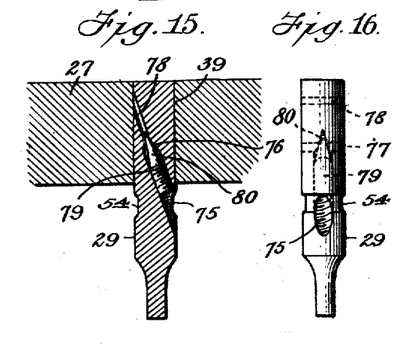
Fig. 15 is a section of a punch and punch retainer-plate, showing a modified form of punch and the manner of securing the same within said retainer-plate.
Fig. 16 is a side elevation of the punch shown in Fig. 15, removed from the punch retainer-plate.
Figure 17:
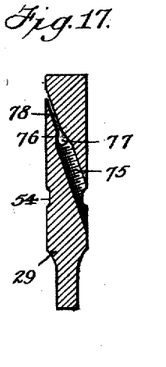
Fig. 17 is a longitudinal section of the punch shown in Figs. 15 and 16, the screw utilized to fasten the punch in the punch retainer-plate being removed from the punch.
Figure 18:
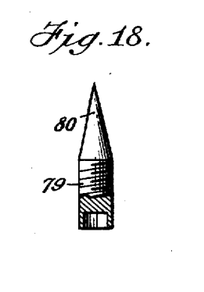
Fig. 18 is a sectional elevation of the screw utilized to fasten the punch shown in Figs. 15, 16 and 17 in the punch retainer-plate.

In Figs. 13 and 14 we have shown the spring-device in modified form in which the header 44 is formed in piece with a stud 73 which is designed to be entered into an opening 73ᵃ formed in the punch retainer-plate. The spring-device as a unit is then secured in place by the securing screw 56 which is entered in a tapped opening 74 extending diagonally upwardly through the header 43 and the adjacent portion of the stud 73. The securing screw extends into the depression 59 which, as hereinbefore stated, may be a spot depression, a parti-circumferential or a circumferential depression. When, however, a softer material than steel is used as a retainer-plate, said depression may be omitted. The remaining parts of the spring-device correspond with those of the preferred construction shown in Figs. 8 and 9 and are similarly lettered.

Figure 19:
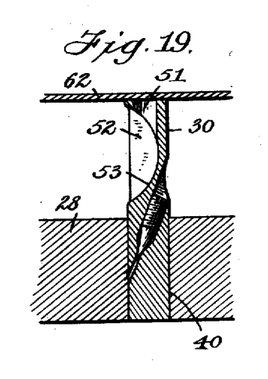
Fig. 19 is a section through a modified form of die and its die retainer-plate and embodying the method of fastening shown for the punch in Fig. 15.
Figure 20:
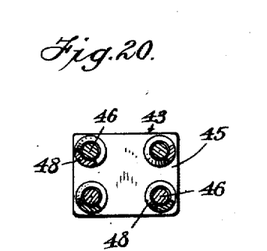
Fig. 20 is a cross section taken on line 20—20, Fig. 13.

For internally securing the punches and dies in their retainer-plates, a modified form of securing means is illustrated in Figs. 15 to 19. The punch in this instance has a tapped opening 75 of a definite diameter formed therein from one side thereof, preferably at an acute angle to its axis. The inner end of this tapped opening is beveled, as at 76, and intersected by a transverse bore 77, from which it is slit, as at 78, to the opposite side of the punch. Entered in this opening is a securing or expanding screw 79, its inner terminal 80 being tapered at a lesser angle than the beveled portion 76 of the tapped opening. When the screw is forced inwardly, it engages the beveled portion of the punch which is thereby expanded against the wall of the opening in which the punch is inserted. This also provides securing means for the punch wholly within the punch and without any projecting portions, while permitting access thereto from the work space between the two retainer-plates of the assembly. As shown in Fig. 19 the die may also be secured in the manner just described and like numerals of reference are applied to this figure for all parts conforming to those shown in Fig. 15.

Therefore, under the modifications illustrated and described, means for securing the punches and dies to their respective retainer-plates are normally confined wholly to the cross sectional area of said punches and dies and in each instance are accessible from the work space between retainer-plates when said punches and dies are secured to the latter. There are consequently no extraneous parts on the punches and dies and the latter may be said to have self-contained securing means.

Our invention, therefore, is simple in construction, comparatively inexpensive, and in each instance, the punches and dies have means to secure them in the retainer-plates receiving them and they are accessible to permit of securing the punches and dies in the retainer-plates without removing the latter from the die-set.

Oftentimes stampings are required in which a number of openings are to be omitted or certain openings are to be reduced in diameter, or enlarged, and it is a simple matter to remove any desired punch-and-die couple from the assembly and substitute punches and dies adapted for punching larger or smaller openings in the same location as provided for by the dies replaced.

Having thus described our invention what we claim is:

1. In a punch and die assembly, punch and die retainer-plates spaced apart and having openings formed therein arranged in pairs with one opening of each pair in each of said retainer-plates and with the openings of each pair in axial alinement, punches in the openings in said punch retainer-plate, dies retained in the openings of said die retainer-plate, and means diagonally passing into and partially out of said punches accessible from the space between said retainer-plates and engaging the walls of the openings receiving said punches.

2. In a punch and die assembly, punch and die retainer-plates spaced apart and having openings formed therein arranged in pairs with one opening of each pair in each of said retainer-plates and with the openings of each pair in axial alinement, punches in the openings in said punch retainer-plate, dies retained in the openings of said die-retainer-plate, and means entered diagonally in said punches for fastening the latter in the openings receiving the same, said means being accessible from the space between said retainer-plates and each of said means being wholly within the overall length of the opening for said means in the punch.

3. In a punch and die assembly, a punch retainer-plate having an opening therein of a given diameter, a punch having one end secured in said opening and a punch terminal at its other end and having also a threaded hole extending through its secured end, and a securing screw threaded into said hole within said opening and engaging the wall of the latter to secure the punch to said punch retainer-plate, said securing screw being accessible from the exposed surface of said retainer-plate.

4. In a punch and die assembly, a retainer-plate having an opening therein of a given size, an element adapted for co-action with a mating element for perforating sheet material and comprising an elongated body having one end thereof entered in said opening, and means entered diagonally in said first-mentioned element accessible from the exposed surface of said retainer-plate and serving to secure the entered end of said first-mentioned element within said opening.

5. A member of a perforating punch-and-die couple formed of cylindrical metallic stock, and adapted to be entered in a retainer plate having an opening to receive at least a portion thereof and means entered diagonally in said member for securing it in said opening and accessible from underneath said retainer plate, at least part of, said means occupying the region of said member secured in said opening.

6. A member of a perforating punch-and-die couple having its greatest diameter at one end adapted to be and having said end entered in an opening in a retainer-plate, said member being formed of a piece of cylindrical steel rod-material, and means diagonally inserted in said member so as to impinge against the wall of said opening and be accessible from an exposed portion of said member when inserted in said retainer plate.

7. A member of a perforating punch-and-die couple formed of a single piece of elongated cylindrical material, and means disposed diagonally within the largest cross sectional area of said member for securing one end of the latter in a holding element, said means being accessible from a point between the ends of said member.

8. A member of a perforating punch-and-die couple formed of a single piece of elongated cylindrical material having fastening means disposed diagonally therein to cause forcible impingement against the wall of an opening when said member is entered therein.

9. In a punch and die assembly, a comparatively thick retainer-member having an opening therein, a member of a perforating punch-and-die couple having a cylindrical end portion entered in said opening and having a tapped bore extending diagonally therethrough, and a screw threaded into said bore and adapted to engage the wall of said opening.

10. In a punch and die assembly, a retainer-plate having an opening therein, a die having one end inserted into said opening so as to project from said plate, said die having a punch-receiving hole in its upper end and means inserted into said die from its projecting portion and extending into the area of said opening causing action against the wall of the latter to secure said die firmly in said plate.

11. In a punch and die assembly, a retainer-plate having an opening therein and a depression in the wall of said opening, a member of a perforating punch-and-die couple conforming in cross-sectional shape to the contour of said opening and entered thereinto, said member having a tapped bore extending therethrough, and a set screw threaded into said bore and extending into the said depression.

12. In a punch and die assembly, a retainer-plate having a round opening therein and a depression in the wall of said opening having a surface at its lower portion inclined at a given angle to the axis of said opening, a member of a perforating punch-and-die couple having a cylindrical body provided with a tapped bore extending diagonally therethrough trending toward said depression, and a set-screw threaded into said tapped bore and having an unthreaded terminal entered in said depression, the peripheral surface of said terminal being at a slight angle to the inclination of the lower portion of said depression so as to tend to force said member inwardly when tightening said set screw.

13. In a punch and die assembly, a retainer-plate having a round opening therein and a V-shaped annular depression in the wall of said opening having its lower half inclined at a given angle to the axis of said opening, a member of a punch-and-die couple having a cylindrical portion provided with a tapped bore whose axis is at a slightly greater angle to the axis of said opening than the lower portion of said annular depression and whose inner end opens into the latter, a set screw threaded into said tapped bore and having a reduced unthreaded inner terminal projecting into said annular depression, said terminal being slightly tapered and slightly rounded at its outer end and said rounded outer end only being in contact with the lower portion of said annular depression so as to tend to draw said member into the opening in said retainer-plate.

14. In a punch and die assembly, a comparatively thick retainer-plate having an opening therein providing a long bearing surface, a member of a perforating punch-and-die couple having a portion entered in said opening, said member having a tapped bore extending diagonally thereinto from one side thereof and tapered at a given angle to its axis at its inner end, a transverse bore at the tapered region of said bore and a slit extending from said transverse bore to the opposite side of said member in line with said tapped bore, and a screw threaded into said bore and having a tapered inner end at a lesser angle to the axis of said tapped bore than the angle of the taper at the inner end of said bore so as to cause portions of said member at opposite sides of said slit to be expanded against the wall of said opening.

15. In a punch and die device, a punch retainer-plate, punches secured in said retainer-plate and extending downwardly therefrom, a stripper-plate having openings into which said punches normally extend, and spring devices between said stripper-plate and said punch retainer-plate, each stripper device comprising a header having a screw-stud extending therefrom, a shoe to which said stripper plate is removably secured and springs interposed between said header and said shoe and acting thereagainst.

16. In a punch and die device, a punch retainer-plate, punches secured to said retainer-plate and extending downwardly therefrom, a stripper plate having openings into which said punches normally extend, and spring devices between said stripper-plate and said punch retainer-plate, each stripper device comprising a header having a screw stud extending therefrom, a shoe to which said stripper plate is removably secured, guide rods secured to said header and slidable in said shoe, spiral springs surrounding said guide rods and bearing at one end against said header and at the other end against said shoe, and a screw passed through said stripper plate and threaded into said shoe.

17. In a punch and die assembly, a retainer-plate having threaded openings therein, a stripper-plate beneath and spaced from said retainer plate, a plurality of spring devices secured to said stripper plate and adapted to be secured to said retainer-plate, each spring device including compressible springs, a header against which said springs bear and a screw bolt passed through said header and projecting therefrom, said screw bolt being brazed to said header so that the projecting portion thereof may be entered in a threaded opening in said retainer-plate upon rotating said spring device as a unit.

18. In combination with the ram and shoe of a die-set or press, a punch retainer-plate secured to said ram, a die retainer-plate secured to said bed, punches projecting downwardly from said punch retainer-plate, dies co-axial with said punches and projecting upwardly from said die retainer-plate, stripper mechanism including a stripper-plate having openings into which the punch ends of said punches extend and spring devices arranged at spaced-apart points not occupied by said punches and removably secured in said retainer-plate, said spring devices having said stripper plate removably secured thereto, auxiliary stripper-devices disposed outside of the regions of said stripper-plate, each auxiliary stripper-device comprising a header through which one of said punches extends, a shoe into which the punch end of said punch extends, guide-rods having their lower ends secured in said shoe and their upper ends guided for movement in said header and spiral springs surrounding said guide-rods and bearing at one end against said header and at the other end against said shoe, and means for removably securing said auxiliary devices to said punches.

19. In combination with the ram and shoe of a die-set or press, a punch retainer-plate secured to said ram, a die retainer-plate secured to said shoe, punches projecting downwardly from said punch retainer-plate, dies co-axial with said punches and projecting upwardly from said die retainer-plate, stripper mechanism including a stripper-plate having openings into which the punch ends of said punches extend and spring devices arranged at spaced apart points not occupied by said punches and removably secured to said punch retainer-plate, said spring devices having said stripper-plate removably secured thereto, auxiliary stripper-devices disposed outside of the region of said stripper-plate, each auxiliary stripper-device comprising a header through which a punch extends, a shoe into which the punch end of said punch extends, guide-rods having their lower ends secured in said shoe and their upper ends guided for movement in said header, and spiral springs surrounding said guide-rods and bearing at opposite ends against said header and said shoe, and a set-screw passed through said header and impinging with its inner end against said punch.

20. In a punch and die assembly, a punch and die in axial alinement with each other, mountings for said punch and die, abutments to which said mountings are secured, said punch and die having each a tapped opening extending obliquely therethrough and said mountings having openings extending therethrough to receive said punch and die in axial alinement, each of the openings in said mountings having a depression therein with an inclined wall-portion arranged at a slight angle to the axis of the punch or die entered therein, and retaining screws in said tapped openings whose engaging terminals are forced wedge-like against the inclined wall-portions of said depressions to force the inner ends of said punch and die against said abutments when tightening said screws.

21. The combination with two spaced-apart abutments, of a punch retainer-plate secured to one of said abutments, a die retainer-plate secured to the other abutment, said retainer-plates being thus arranged for relative movement toward and from each other and having openings therein in axial alinement, at least one of said openings having a depression with an inclined wall, a member of a punch-and-die couple having one end thereof entered in said opening and having an obliquely disposed tapped opening therein trending toward said depression, a retaining-screw threaded into said tapped opening and engaging the inclined wall of said depression under wedge action to force said member of the punch-and-die couple against the abutment to which the retainer-plate in which said member is entered is secured, and a second member of said punch-and-die couple secured in the opening in the other of said retainer-plates.

22. In a punch and die assembly, a retainer-plate having a round opening therein and a depression in the wall of said opening having a surface at its lower portion inclined at a given angle to the axis of said opening, a member of a perforating punch-and-die couple having a cylindrical body portion with a tapped bore extending diagonally therethrough trending toward said depression, a set-screw threaded into said tapped bore and having one end entered in said depression, said screw having its axis at a slight angle to said inclined surface at the lower portion of said depression so as to tend to force said member inwardly when tightening said set-screw.

23. In a punch and die assembly, a comparatively thick retainer-plate having an opening therein, a member of a punch-and-die couple having one end thereof fitting into said opening, and means normally carried by said punch and having at least a portion thereof within the portion of said member fitting in said opening and adapted to engage the wall of said opening to securely fasten said member thereinto, said means being accessible from the surface of said retainer-plate from which said member projects.

24. In a punch and die assembly, a retainer-plate having an opening therein and a depression in the wall of said opening, a member of a perforating punch-and-die couple having one end thereof entered in said opening and provided with a tapped bore extending diagonally therethrough trending toward said depression, and a set screw threaded into said tapped bore and having one end entered in said depression.

25. In a punch and die assembly, a retainer-plate having an opening therein, a member of a punch-and-die couple entered in said retainer-plate and projecting therefrom, and means diagonally entered in said member at least partially within the confines of said opening accessible from the face of said retainer plate from which said member projects, said means serving to secure said member in said opening.

26. In a punch and die assembly, a comparatively thick retainer-plate having at least two openings of like diameter therethrough, the thickness of said plates providing openings each of whose longitudinal measurement at least equals the diameter thereof, said openings having their minimum center-to-center measurement equalling the diameter of one of said openings, a member of a punch-and-die couple entered in each of said openings and having its largest transversely-dimensioned portion in the opening in which it is entered, and securing means entered in the entered end of each of said members from a point adjacent said retainer-plate and extending into the region of said member confined within the opening in which it is entered so as to completely conceal said means and so that holes may be punched in a work-piece whose center-to-center measurement will correspond with that of the openings in said retainer-plate.

27. In a punch and die assembly, a comparatively thick retainer-plate having at least two openings of different diameters therethrough, the thickness of said plate providing openings each of whose longitudinal measurement at least equals the diameter thereof, said openings having their minimum center-to-center measurement equalling the measurement of the combined radii of said members, a member of a punch-and-die couple entered in each of said openings and having its largest transversely-dimensioned portion in the opening in which it is entered, and means entered in the entered end of each of said members from an exposed point of said member and extending into the region of said member confined within the opening in which it is entered so as to completely conceal said means and so that holes may be punched in a work-piece whose center-to-center measurement will correspond with the center-to-center measurement of the openings in said retainer-plate.

28. In a punch and die assembly, a retainer-plate having an opening therein, a member of a perforating punch-and-die couple having one end thereof entered in said opening so as to project from said retainer-plate, and a securing screw entered in the portion of said member inserted in said opening and when tightened serving to secure said member firmly within said opening, said securing screw being accessible from an exposed portion of said member and extending at least partially into the portion of said member entered in said opening.

LAWRENCE V. WHISTLER.
SANFORD A. WHISTLER.

---

CERTIFICATE OF CORRECTION.

Patent No. 2,386,920.  October 16, 1945.

LAWRENCE V. WHISTLER, ET AL.

It is hereby certified that error appears in the printed specification of the above numbered patent requiring correction as follows: Page 3, second column, line 20, for "retaining-plate" read --retainer-plate--; page 4, second column, line 28, for "striper-plate" read --stripper-plate--; line 30, for "an the" read --and the--; page 6, first column, line 39, claim 6, for "adapted to be and having said end" read --and having said end adapted to be--; and that the said Letters Patent should be read with this correction therein that the same may conform to the record of the case in the Patent Office.

Signed and sealed this 29th day of January, A. D. 1946.

Leslie Frazer (Seal)  First Assistant Commissioner of Patents punch-and-die couple entered in said retainer-plate and projecting therefrom, and means diagonally entered in said member at least partially within the confines of said opening accessible from the face of said retainer plate from which said member projects, said means serving to secure said member in said opening.

26. In a punch and die assembly, a comparatively thick retainer-plate having at least two openings of like diameter therethrough, the thickness of said plates providing openings each of whose longitudinal measurement at least equals the diameter thereof, said openings having their minimum center-to-center measurement equalling the diameter of one of said openings, a member of a punch-and-die couple entered in each of said openings and having its largest transversely-dimensioned portion in the opening in which it is entered, and securing means entered in the entered end of each of said members from a point adjacent said retainer-plate and extending into the region of said member confined within the opening in which it is entered so as to completely conceal said means and so that holes may be punched in a work-piece whose center-to-center measurement will correspond with that of the openings in said retainer-plate.

27. In a punch and die assembly, a comparatively thick retainer-plate having at least two openings of different diameters therethrough, the thickness of said plate providing openings each of whose longitudinal measurement at least equals the diameter thereof, said openings having their minimum center-to-center measurement equalling the measurement of the combined radii of said members, a member of a punch-and-die couple entered in each of said openings and having its largest transversely-dimensioned portion in the opening in which it is entered, and means entered in the entered end of each of said members from an exposed point of said member and extending into the region of said member confined within the opening in which it is entered so as to completely conceal said means and so that holes may be punched in a work-piece whose center-to-center measurement will correspond with the center-to-center measurement of the openings in said retainer-plate.

28. In a punch and die assembly, a retainer-plate having an opening therein, a member of a perforating punch-and-die couple having one end thereof entered in said opening so as to project from said retainer-plate, and a securing screw entered in the portion of said member inserted in said opening and when tightened serving to secure said member firmly within said opening, said securing screw being accessible from an exposed portion of said member and extending at least partially into the portion of said member entered in said opening.

LAWRENCE V. WHISTLER.
SANFORD A. WHISTLER.

---

CERTIFICATE OF CORRECTION.

Patent No. 2,386,920.            October 16, 1945.

LAWRENCE V. WHISTLER, ET AL.

It is hereby certified that error appears in the printed specification of the above numbered patent requiring correction as follows: Page 3, second column, line 20, for "retaining-plate" read --retainer-plate--; page 4, second column, line 28, for "striper-plate" read --stripper-plate--; line 30, for "an the" read --and the--; page 6, first column, line 39, claim 6, for "adapted to be and having said end" read --and having said end adapted to be--; and that the said Letters Patent should be read with this correction therein that the same may conform to the record of the case in the Patent Office.

Signed and sealed this 29th day of January, A. D. 1946.

Leslie Frazer
First Assistant Commissioner of Patents (Seal)